United States Patent
Feng et al.

(10) Patent No.: US 11,148,253 B2
(45) Date of Patent: Oct. 19, 2021

(54) COOKING UTENSIL WITH NON-STICK CAPABILITY

(71) Applicant: LES PROMOTIONS ATLANTIQUES INC. / ATLANTIC PROMOTIONS INC.

(72) Inventors: Zhihui Feng, Guangdon (HK); Junbin Zhang, Shatin (HK)

(73) Assignee: LES PROMOTIONS ATLANTIQUES INC. /ATLANTIC PROMOTIONS INC., Longueuil (CA)

( * ) Notice: Subject to any disclaimer, the term of this patent is extended or adjusted under 35 U.S.C. 154(b) by 440 days.

(21) Appl. No.: 16/020,713

(22) Filed: Jun. 27, 2018

(65) Prior Publication Data
US 2018/0311790 A1     Nov. 1, 2018

Related U.S. Application Data

(62) Division of application No. 14/312,402, filed on Jun. 23, 2014, now abandoned.

(51) Int. Cl.
*B24C 1/10*     (2006.01)
*A47J 36/02*     (2006.01)

(52) U.S. Cl.
CPC .............. *B24C 1/10* (2013.01); *A47J 36/025* (2013.01)

(58) Field of Classification Search
CPC ........... A47J 36/025; B24C 1/10; B21D 51/22
USPC ...................................................... 220/573.1
See application file for complete search history.

(56) References Cited

U.S. PATENT DOCUMENTS

| | | | |
|---|---|---|---|
| 1,216,973 A | * | 2/1917 | Epprecht ................. A47J 37/10 99/425 |
| 2,534,407 A | | 12/1950 | Bramberry |
| 3,271,653 A | | 9/1966 | Wolf |
| 5,003,805 A | | 4/1991 | Thompson |
| 5,293,320 A | | 3/1994 | Thompson et al. |
| 5,829,116 A | | 11/1998 | Vilon |
| 5,992,204 A | | 11/1999 | Jonkka et al. |
| 6,038,900 A | | 3/2000 | Miyasaka |
| 6,092,520 A | | 7/2000 | Hasegawa |

(Continued)

FOREIGN PATENT DOCUMENTS

| | | |
|---|---|---|
| CA | 2833361 A1 | 5/2014 |
| CN | 202960058 U | 6/2013 |

(Continued)

OTHER PUBLICATIONS

Meta Filter "Manually Smooth Cast Iron Pans?", Mar. 11, 2010.
Canadian Examination Search Report issued in Canadian Application No. 2,855,060, dated Oct. 5, 2015.
Extended European Search Report issued in European Application No. 15169471.8, dated Nov. 11, 2015.

(Continued)

*Primary Examiner* — Anthony D Stashick
*Assistant Examiner* — Raven Collins
(74) *Attorney, Agent, or Firm* — McDermott Will & Emery LLP

(57) ABSTRACT

The present invention relates to a method of treating a surface of a utensil as well as to a utensil having been treated by the method. A substrate is provided to form a component of the utensil. The substrate has a surface area to be treated. Through a shot peening process particles impact the substrate substantially evenly across the surface area, so as to dimple the substrate with depressions across the surface area, in order to reduce adhesion of matter on the treated surface area of the utensil.

1 Claim, 5 Drawing Sheets

(56) References Cited

U.S. PATENT DOCUMENTS

| | | | |
|---|---|---|---|
| 7,210,322 B2* | 5/2007 | Iwata | B24C 1/10 |
| | | | 700/117 |
| 7,968,640 B2 | 6/2011 | Ganguli et al. | |
| 8,372,496 B2 | 2/2013 | Le Bris et al. | |
| 8,501,289 B2 | 8/2013 | Le Bris et al. | |
| 2003/0126996 A1 | 7/2003 | Cheng | |
| 2005/0249886 A1 | 11/2005 | Ge | |
| 2009/0165656 A1 | 7/2009 | Coudurier et al. | |
| 2011/0223300 A1 | 9/2011 | Purgatorio | |
| 2013/0273394 A1* | 10/2013 | Sheu | B21B 28/02 |
| | | | 428/687 |
| 2014/0154476 A1* | 6/2014 | Perillon | A47J 36/025 |
| | | | 428/172 |
| 2016/0113439 A1* | 4/2016 | Fu | A47J 27/002 |
| | | | 220/573.2 |

FOREIGN PATENT DOCUMENTS

| | | | | |
|---|---|---|---|---|
| CN | 103612438 A | 3/2014 | | |
| CN | 103859999 A | 6/2014 | | |
| EP | 0092309 A1 | 10/1983 | | |
| EP | 0568322 A2 | 11/1993 | | |
| EP | 0960666 | * 5/1998 | | B21D 51/22 |
| FR | 2743742 B1 | 4/1998 | | |
| FR | 2923696 A1 | 5/2009 | | |
| GB | 1303319 A | 1/1973 | | |
| JP | 57-101613 A | 6/1982 | | |

OTHER PUBLICATIONS

Canadian Examination Search Report issued in Candian Application No. 2,855,060, dated Jan. 26, 2016.

* cited by examiner

COOKING UTENSIL WITH NON-STICK CAPABILITY

FIELD

The present invention relates to utensils and the like. More particularly, the present invention relates to a method of treating a surface of a utensil as well as to a utensil having been treated by the method.

BACKGROUND

Known in the art are cooking vessels or baking vessels which have a non-stick coating to prevent food from sticking to the vessel while the food is heated.

In order to improve the non-stick performance, manufacturers have developed a wrinkle non-stick coating material. However this process presents numerous drawbacks.

Hence, in light of the aforementioned, there is a need for an improved system which, by virtue of its design and components, would be able to overcome some of the above-discussed prior art concerns.

SUMMARY OF THE INVENTION

The object of the present invention is to provide a device which, by virtue of its design and components, satisfies some of the above-mentioned needs and is thus an improvement over other related methods known in the prior art.

According to an aspect, the above mentioned object is achieved by method of treating a surface of a utensil, the method comprising:
 a) providing a substrate to form a component of the utensil, the substrate having a surface area to be treated; and
 b) shot peening the substrate substantially evenly across the surface area with particles, for dimpling the substrate with depressions across the surface area, to reducing adhesion of matter on the treated surface area of the utensil.

In particular embodiments, the shot peening may comprise impacting the particles against the surface area with a density included between about 100 particles/cm$^3$ to about 350 particles/cm$^3$. Moreover, each particle may impact the surface area of the substrate at a velocity ranging between about 10 m/sec. and about 30 m/sec. Moreover, each particle may impact the surface area of the substrate at an impact load ranging between about 0.65 PSI and about 2.5 PSI.

In particular embodiments, the depressions formed at step (b) have an average depth ranging between about 0.1 mm and about 0.5 mm. Each depression may have a diameter ranging between about 1 mm and about 3 mm.

In particular embodiments, the particles of step (b) comprise a plurality of balls, which may be steel balls. Each ball may have a diameter ranging between about 1 mm and about 4 mm.

In particular embodiments, the method may comprise prior to step (b), cleaning the substrate to remove oxidation from a surface of the substrate. The method may further comprise after step (b):
 sand blasting the surface area of the substrate; and
 coating the surface area with a non-stick coating.

In particular embodiments, the substrate of step (a) is configured to form a vessel of a cooking utensil and the surface area to be treated includes at least a cooking surface of the cooking utensil. The surface area impacted by the shot peening may comprise substantially a first surface of the substrate corresponding substantially to an inner side of the cooking utensil. Moreover, the impacted surface area may further include at least a portion of a second surface of the substrate, opposite to the first surface, corresponding to an outer side of the cooking utensil.

In particular embodiments, the substrate of step (a) is configured to form a blade of a cutting utensil and the surface area to be treated includes at least a contact surface of the cutting utensil.

In particular embodiments, the substrate may comprise cast iron, aluminum, aluminum alloy, stainless steel-aluminum, stainless steel, copper, other suitable composite materials, and/or the like.

According to another aspect, there is provided a utensil for handling food, the utensil comprising a treated surface having depressions distributed substantially evenly across said treated surface, the depressions having being formed through a shot peening process.

In particular embodiments, the treated surface comprises at least a contact surface for engaging with the food.

In particular embodiments, the utensil may be a cooking utensil and the treated surface may include at least a cooking surface of the cooking utensil. The cooking utensil may comprise a vessel. The treated surface may include at least an inner surface of the vessel. The treated surface may further include at least a portion of an outer surface of the vessel.

The cooking utensil may be a cooking pan or pot, a baking dish and/or the like.

In particular embodiments, the utensil may be a cutting utensil and the treated surface may include at least a cutting edge of a blade of the cutting utensil.

According to yet another aspect, there is provided a method of treating a surface of a utensil, the method comprising:
 a) providing a substrate to form a component of the utensil, the substrate having a surface area to be treated; and
 b) shot peening the substrate substantially evenly across the surface area with particles, to form depressions in the substrate across the surface area, for reducing adhesion of matter on the treated surface area of the utensil.

According to yet another aspect, there is provided a blade for a cutting equipment comprising a contact surface for engaging matter to be cut, the contact surface comprising depressions distributed substantially evenly across the contact surface, said depressions being formed through a shot peening process.

According to yet another aspect, there is provided a cooking utensil comprising a cooking surface, the cooking surface having depressions distributed substantially evenly across the contact surface, said depressions being formed through a shot peening process.

Advantageously, the treated surface is enhanced with a physical anti-adherent effect and surface passivation effect resulting from a strong impact of the particles, which increases the density and strength of the substrate, increasing the rigidity and durability of the resulting utensil, as well as to increase durability of the anti-adherent effect.

Still advantageously, during cooking, liquids are stored in the pit of the depressions forming a film of fluid which cushions the food being cooked. This physical non-stick approach can effectively improve cooking performance by about three times in comparison with a cooking utensil made from a same material but without the passivation treatment. The dimpled surface further reduces loss of nutrients from the food during the cooking process, as well as to reduce friction between the food and the cooking utensil.

Other objects, advantages and features of the present invention will become more apparent upon reading of the following non-restrictive description of preferred embodiments thereof, given for the purpose of exemplification only, with reference to the accompanying drawings.

DETAILED DESCRIPTION

Figure 1:
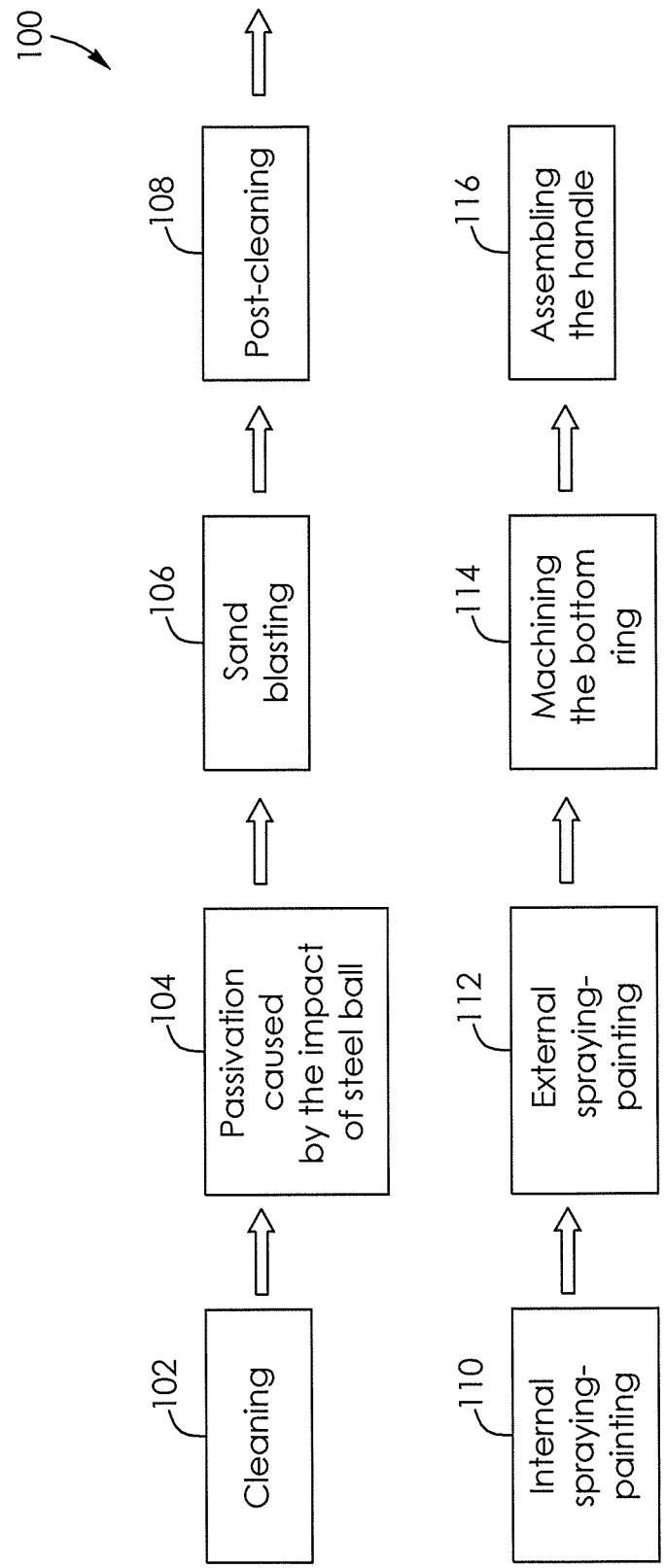
FIG. 1 is a block diagram showing steps of a method, in accordance with an embodiment.
Figure 2:
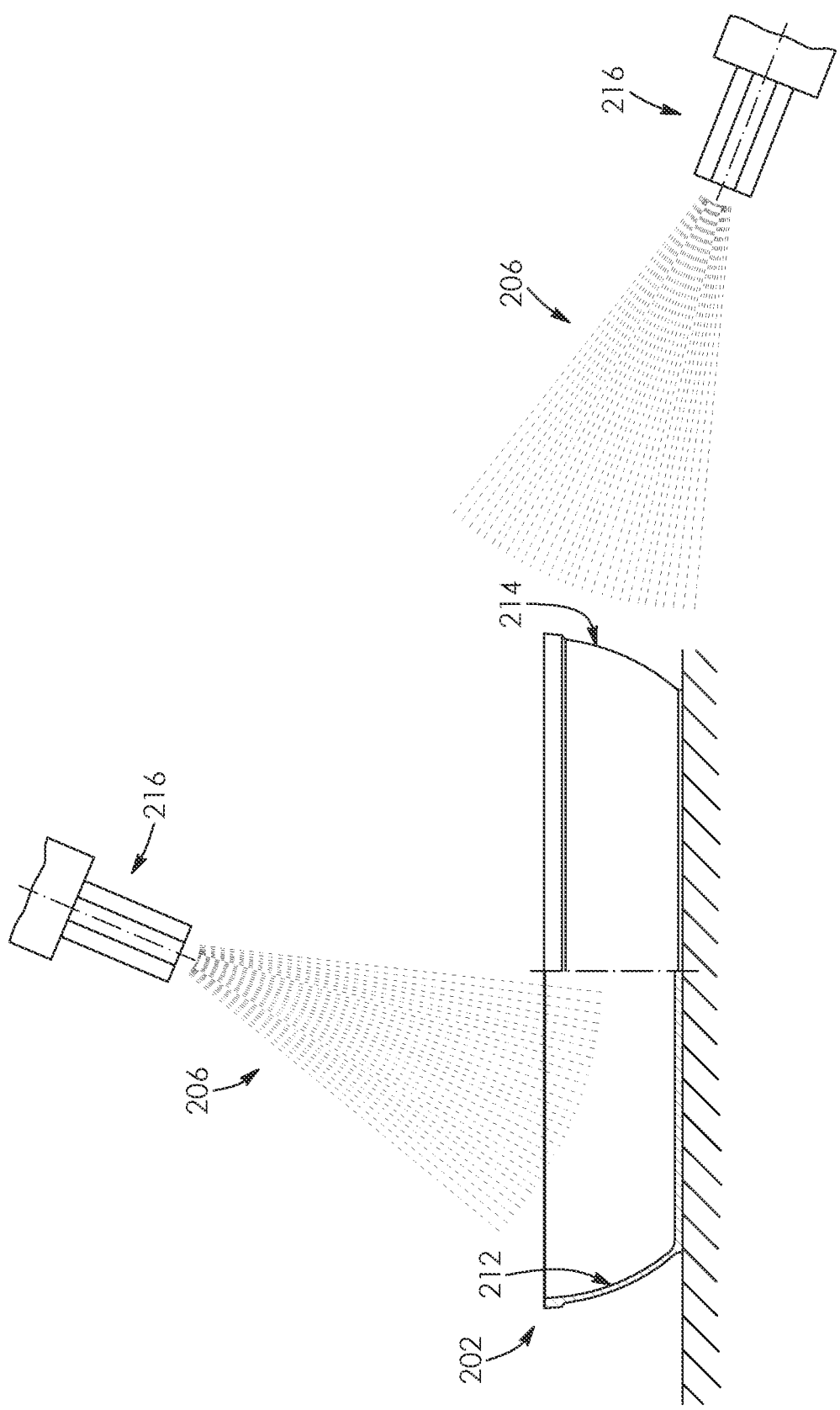
FIG. 2 is a side plan view of a blank being treated by the method shown in FIG. 1, the blank being shown with a partial cut-away showing a cross-section of the blank, the blank being further shown with shot peening equipment, in accordance with an embodiment.
Figure 3:
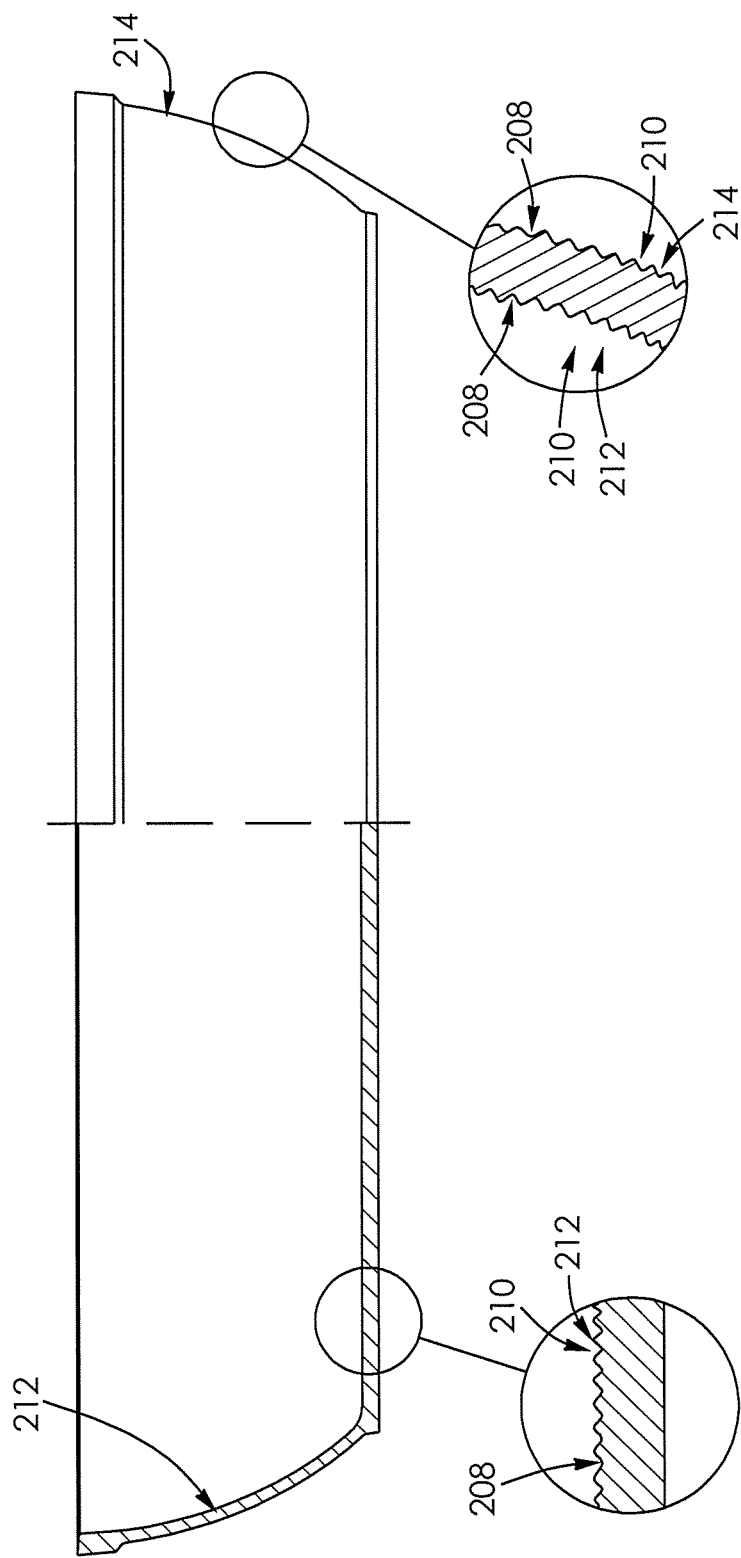
FIG. 3 is another side plan view of the blank shown in FIG. 2, portion's of the blank being shown in an enlarged view.

In the following description, the same numerical references refer to similar elements. The embodiments, geometrical configurations, materials mentioned and/or dimensions shown in the figures or described in the present description are preferred embodiments only, given for exemplification purposes only.

Broadly described, the embodiment described below concerns subjecting a cookware blank with steel balls to impact the surface densely and uniformly at high speed and kinetic energy to produce a homogeneous passivation layer having depressions substantially shaped like meteorite craters. In addition, a non-stick coating is applied in order to achieve the dual effects of both physical and coating non-stick properties.

More particularly, with reference to FIGS. 1 to 5, there is provided a method 100 of manufacturing a cooking utensil 200.

A substrate 202 (also referred to herein as "substrate blank" or "blank") is shaped to provide the vessel 204 (or "vessel portion") for the cooking utensil 200. The vessel typically has a diameter ranging from 12 cm to 60 cm, with a height of 25 cm or less.

A step 102 is directed to cleaning the shaped substrate blank 202 to remove the oil and aluminum alloy metal surface oxidation layer in order to achieve a clean metal molecule surface.

The cleaned and dry blank 202 is then subjected to a shot peening process 104 (also referred to herein as "passivation"). More particularly, the shot peening process involves impacting the blank 202 with stainless and high strength alloy steel balls 206 with a density of 200 particles/cm$^3$ with a final velocity of 21 m/sec, providing an impact load of 0.92 N or 1.3 PSI. The balls 206 have a diameter of 2 mm. The shot peening process 104 provides the blank 202 with depressions 208 having a substantially semi-spherical shape. The depressions 208 are distributed substantially homogeneously and substantially densely across the treated surface of the blank forming a concavely and convexed grooved (or "dimpled") surface 210.

The shot peening process is made by a high pressure jetting equipment line 216 having a double-front and double-back decompression chamber, where the steel balls 206 move densely and uniformly at 360°, and additionally high pressure air flow cause the balls 206 to impact the treated surface evenly.

The depressions 208 on the dimpled surface 210 have an average depth of 0.2 to 0.3 mm and an average diameter ranging between 1 to 1.5 mm. The blank 202 is subjected to the shot peening process on the inner side 212, and on an exterior side of the blank 214, for easier cleaning.

It is to be understood in accordance with alternate embodiments that the shot peening process may be applied to only one side of the blank 202 for example, and even to a portion of either side 212, 214 of the blank 202.

It is to be understood that depending on particular embodiments, the steel ball material may be a high-alloy steel ball (of type YG6, YG6X, YG8, YG8X, YN6, YN9, or the like), a stainless steel ball (of type 440C, 304, 316L, 420, 430, or the like), or a carbon low alloy steel ball (of type A3, Q195, Q235, AIS1010, AISI1015, or the like).

In a subsequent step 106, the internal surface 210 is sand blasted using 40 #to 65 #high quality corundum to produce a microcosmic level rough surface of 2 to 4 μm in depth, on the dimpled surface 210. This roughened surface ensures a better adhesion of the non-stick coating, as will be explained further below.

A post-cleaning step 108 cleans the metal wound without any incrustation scale, and includes cleaning agent spraying, hot water spraying, first cold water spraying, second cold water spraying, third cold water spraying, a first negative ion water spraying, a second negative ion water spraying, drying at a temperature of 85° C. and quenching with cool air.

At 110, 112, a non-stick coating is then sprayed and sintered on the internal and external surfaces 212, 214 of the blank 202.

At 114, a ring is machined on a bottom surface of the blank 202.

At 116, one or more handle 218 is then assembled onto the blank 202, to form the cooking utensil 200. It is to be understood that in alternative embodiments, the handle may be made integrally with the vessel portion of the cooking utensil.

Advantageously, the combined effects of both physical and non-stick coating significantly improves the durability of the anti-adherent performance. Experiments show that under the same conditions, the service life of a cooking utensil made with the above-described method is increased by 3 to 5 times or more in comparison to a cooking utensil without being subjected to the above-described shot peening process. The shot peening process increases the density and strength of the metal surface of the cooking utensil, thereby improving the wear-resistance of the surface by twice or more in comparison to cooking utensils which have not been subjected to the above-described shot peening process.

Figure 4:
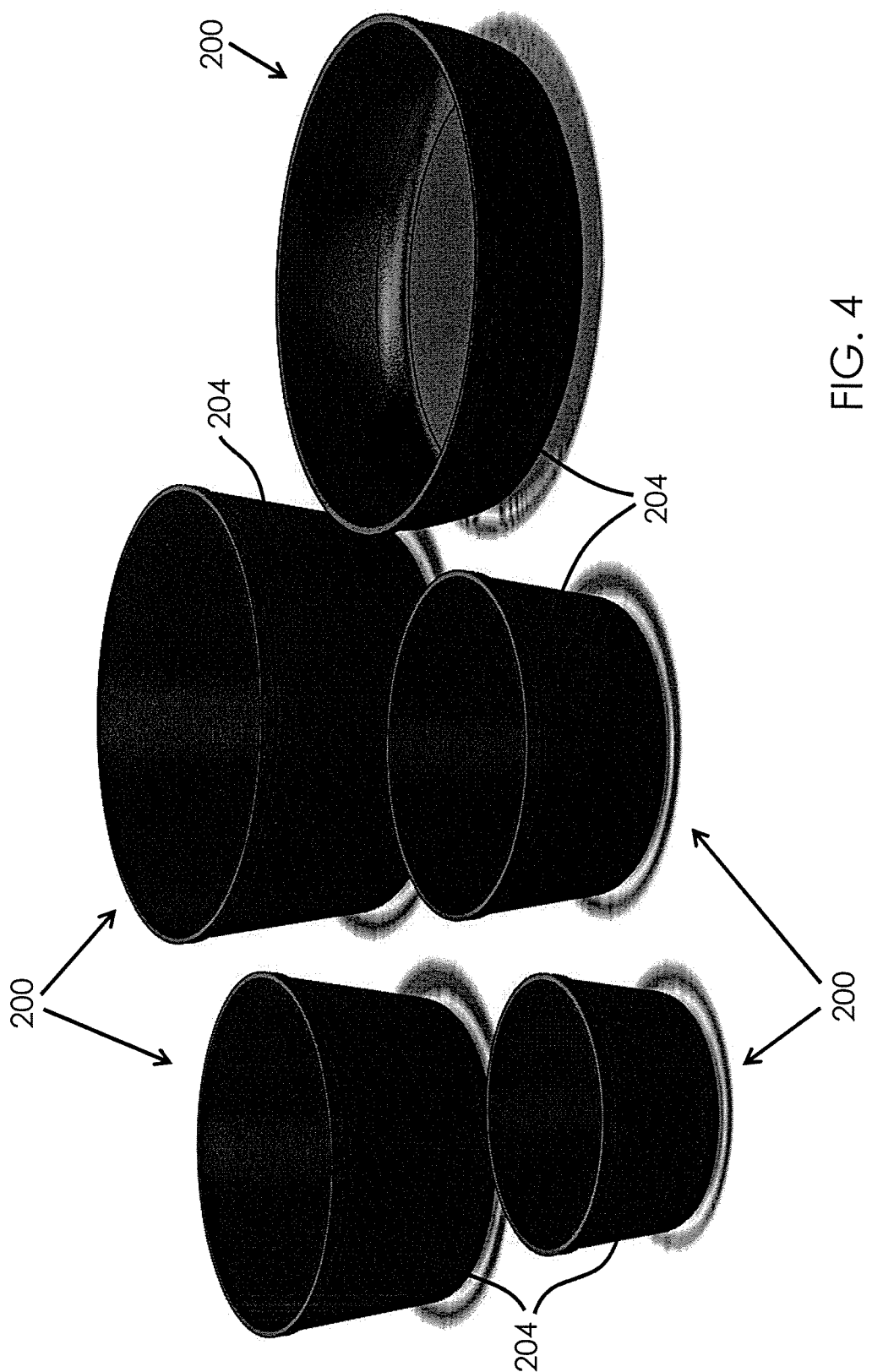
FIG. 4 shows vessel portions of cooking utensils having been treated in accordance with steps of the method shown in FIG. 1.
Figure 5:
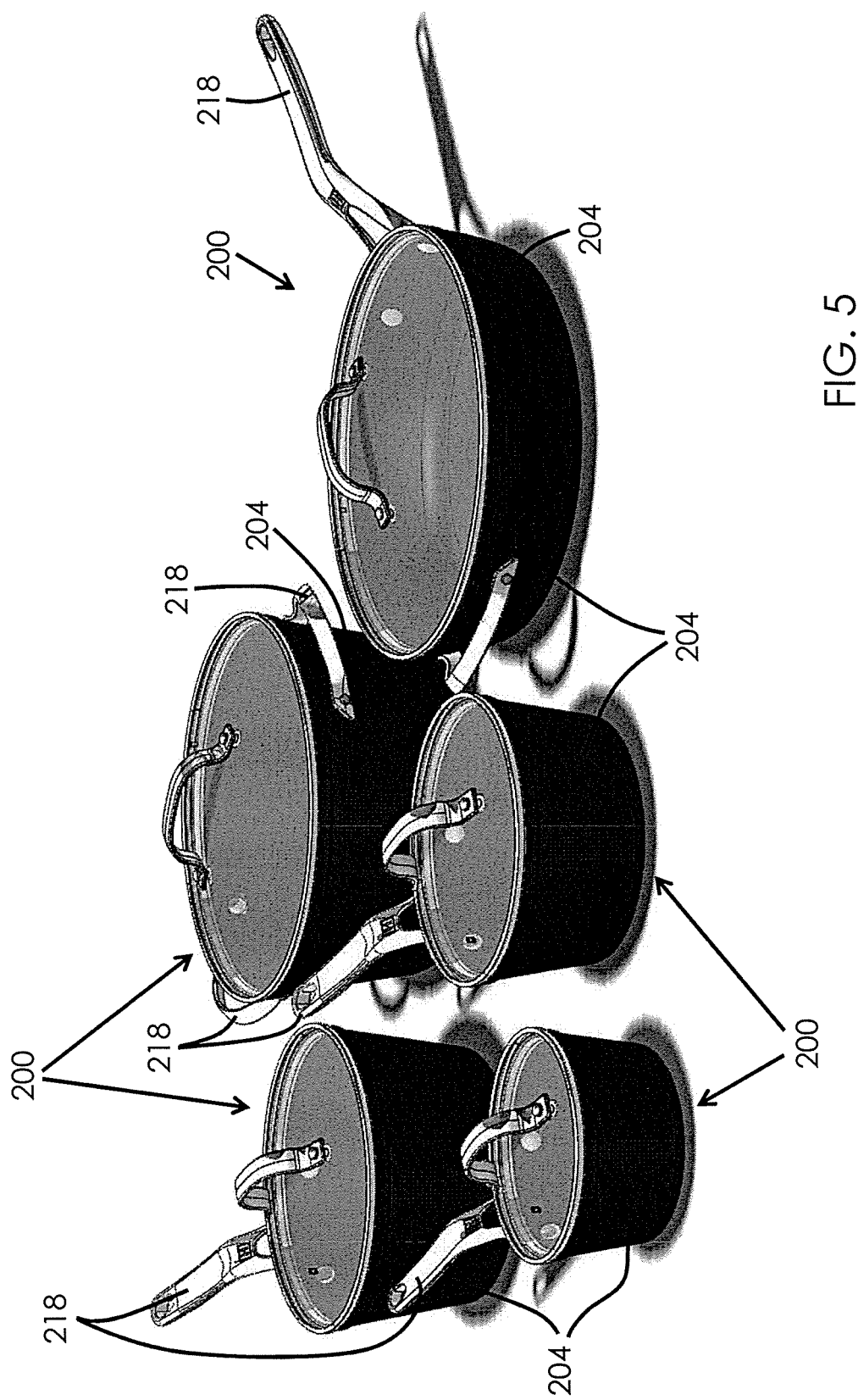
FIG. 5 shows cooking utensils having been manufactured in accordance with the method shown in FIG. 1, the cooking utensils being shown with corresponding covers.

It is to be understood that the cooking utensil may be a cooking pot or pan as illustrated in FIGS. 4 and 5, or any suitable cooking, heating or baking dish, as may be easily understood by the person skilled in the art. It is to be understood also that the above-described surface treatment method may be easily applicable to other kitchen utensils such as knife blades, or even other equipment where anti-adherent properties are desirable.

Inspection, measurements and tests were conducted as follows.

For the inspection of surface smoothness and roughness, an electronic roughness tester was used in combination with electron microscopy. The measured depth ranged from 0.2 to 0.3 mm; the rounded surface diameter measured ranged from 1 to 1.5 mm, and the roughness measured is 2 to 4 µm.

The hardness of the treated surface was measured by an electronic hardness measuring instrument. The resulting hardness measured was HB 32 to 34 (the surface hardness of ordinary 3003 aluminum plate is HB 25 to 27).

To measure the thickness of the non-stick coating, an aluminum plate measuring 10×10×1.5 mm was placed in a cookware. This assembly was subjected to the spray-painting of the non-stick coating material. The aluminum plate was then removed from the cookware for measuring the thickness of the coating by using an electronic film thickness measuring instrument.

A cross-cut peel test was made on the internal and external surface coating, using a cross-cutting device, according to the Standard Hundred Grids Test (QB/T2421-98).

A slat water resistance test was conducted according to the QB/T2421-98 standard.

A dishwasher performance test was conducted according to the EN-12875-1 standard.

An oven test was conducted according to the EN-12983 standard.

An LGA vibration and plane wear test were conducted according to the QB/T2421-98/QB-T242-DuPont standard/ST009-Varberg standard.

A fried egg test was conducted to determine the life span of the cookware. The cookware is heated up to 175° C., and an egg is placed in the cookware for cooking. The egg is easily separated after being cooked solid. Eggs are thus cooked repeatedly using the same cookware. The test results in a failure when the egg does not separate easily before 300 repetitions are reached. The experimental results show that an egg could be cooked and separated easily from the same cookware having been treated with the above-described shot peening process, 390 times. In contrast, a cookware which was not treated with the shot peening process only achieves 130 repetitions.

Although the above-described embodiment is directed to the manufacturing of a cooking utensil, it is to be understood that embodiments of the present invention may be applied to manufacture civil, commercial and small household electrical kitchenware made from cast iron, aluminum, aluminum alloy, stainless steel-aluminum, stainless steel, copper and other composite materials, by stretching, punching, casting, die casting.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. A cooking utensil with non-stick capability, comprising:
a cooking vessel; and
a handle operatively connected to the cooking vessel for handling the cooking utensil;
wherein the cooking vessel includes an inner cooking surface provided with a homogeneous passivation layer having depressions substantially shaped like meteorite craters, said depressions being positioned, shaped and sized about the cooking surface of the cooking vessel for receiving therein a cooking liquid which forms a fluid film and cushions food being cooked by the cooking utensil, thereby providing the cooking utensil with both a physical anti-adherent effect, as well as surface passivation effect;
wherein the depressions have a substantially semi-spherical shape, with an average depth of about 0.1 mm to about 0.5 mm, and an average diameter ranging between about 1 mm to about 3 mm;
wherein the depressions have an average depth of about 0.2 mm to about 0.3 mm, and an average diameter ranging between about 1 mm to about 1.5 mm;
wherein the cooking vessel includes a substrate made of a material selected from the group consisting of cast iron, aluminum, aluminum alloy, stainless steel-aluminum, stainless steel, copper, and composite material;
wherein the homogeneous passivation layer of the cooking vessel is produced by a manufacturing process where impact balls, having a diameter ranging between about 1 mm and about 4 mm, impact a blank of the cooking vessel densely and uniformly at high speed and kinetic energy;
wherein the homogeneous passivation layer of the cooking vessel is produced by a shot-peening process;
wherein the shot-peening process involves impacting a blank of the cooking vessel with impact balls with a density ranging between about 100 particles/cm$^3$ to about 350 particles/cm$^3$, and at a velocity ranging between about 10 m/sec. to about 30 m/sec., providing an impact load ranging between about 0.65 PSI and about 2.5 PSI;
wherein the shot peening process involves impacting the blank of the cooking vessel with stainless and high strength alloy steel balls with a density of about 200 particles/cm$^3$, and with a final velocity of about 21 m/sec., providing an impact load of about 1.3 PSI;
wherein the steel balls are selected from the group consisting of high-alloy steel balls (of type YG6, YG6X, YG8, YG8X, YN6, YN9, or the like), stainless steel balls (of type 440C, 304, 316L, 420, 430, or the like), and carbon low-alloy steel balls (of type A3, Q195, Q235, AIS1010, AISI1015, or the like);
wherein the depressions are distributed substantially homogeneously and substantially densely across a treated surface of the blank forming a dimpled surface with concavely and convexed grooved sections;
wherein an overall resulting hardness of the cooking vessel is between about 32 HB and about 34 HB;
wherein the homogeneous passivation layer having depressions substantially shaped like meteorite craters is further provided on an outer surface of the cooking vessel;
wherein an outer non-stick coating is further applied to said homogeneous passivation layer in order to provide the cooking utensil with a dual non-stick capability resulting from both physical deformation of the inner cooking surface of the cooking vessel and from the non-stick coating thereof;
wherein the non-stick coating is sintered onto internal and external surfaces of the cooking vessel;
wherein the cooking vessel includes a sand-blasted surface underlining the outer non-stick coating for ensuring a better adhesion of the non-stick coating;

wherein the sand-blasted surface is provided with a microcosmic level rough surface of about 2 μm to about 4 μm in depth;

wherein a bottom surface of the cooking vessel is provided with a machined ring; and wherein the cooking utensil is a cooking utensil selected from the group consisting of a cooking pot, a cooking pan, a cooking dish, a heating dish and a baking dish.

\* \* \* \* \*